United States Patent [19]
Wiklof et al.

[11] Patent Number: 6,056,199
[45] Date of Patent: May 2, 2000

[54] METHOD AND APPARATUS FOR STORING AND READING DATA

[75] Inventors: Christopher A. Wiklof, Everett; Edward M. Millet, Lake Forest Park, both of Wash.

[73] Assignee: Intermec IP Corporation, Beverly Hills, Calif.

[21] Appl. No.: 09/064,886

[22] Filed: Apr. 20, 1998

Related U.S. Application Data

[63] Continuation-in-part of application No. 08/978,608, Nov. 26, 1997, abandoned, which is a continuation of application No. 08/533,568, Sep. 25, 1995, abandoned.

[51] Int. Cl.⁷ .................................................. G06K 7/10
[52] U.S. Cl. .......................... 235/462.45; 235/462.46; 235/472.01
[58] Field of Search ...................... 235/462.45, 462.46, 235/472.01

[56] References Cited

U.S. PATENT DOCUMENTS

| | | | |
|---|---|---|---|
| 4,523,087 | 6/1985 | Benton | 235/379 |
| 4,575,621 | 3/1986 | Dreifus | 235/380 |
| 4,792,910 | 12/1988 | Lange | 364/519 |
| 4,841,128 | 6/1989 | Gröttrup et al. | 235/491 |
| 4,916,296 | 4/1990 | Streck | 235/454 |
| 5,280,159 | 1/1994 | Schultz et al. | 231/382 |
| 5,324,922 | 6/1994 | Roberts | 235/375 |
| 5,324,927 | 6/1994 | Williams | 235/494 |
| 5,389,770 | 2/1995 | Ackley . | |
| 5,434,401 | 7/1995 | Bauser | 235/454 |
| 5,434,572 | 7/1995 | Smith | 342/44 |
| 5,484,997 | 1/1996 | Haynes | 235/492 |
| 5,489,908 | 2/1996 | Orthmann et al. | 342/42 |
| 5,550,547 | 8/1996 | Chan et al. | 342/42 |
| 5,594,228 | 1/1997 | Swartz et al. | 235/383 |
| 5,640,002 | 6/1997 | Ruppert et al. . | |

OTHER PUBLICATIONS

Dallas Semiconductor Corporation, Book of DS199x Touch Memory Standards, 1992.

*Primary Examiner*—Harold I. Pitts
*Attorney, Agent, or Firm*—Perkins Coie LLP

[57] ABSTRACT

A method and apparatus for storing, reading, and updating information abode a plurality of target objects. The apparatus includes a data reader and a plurality of readable and writable tags, each tag including a memory. The reader produces a modulated interrogation signal or beam for activating and writing to the tag. The detector within the tag detects the modulated interrogation signal and, in response thereto, accesses the memory for reading or writing. The tag also includes an emitter so that the tag may be read by the reader. During reading, data is retrieved from the memory and the emitter within the tag is modulated to produce a data signal representing the retrieved data. The tags also include optically readable symbols that supply control information for use by the reader in reading from and writing to the memories of the tags. In one embodiment, the tag takes the form of a photonic tag, the interrogation signal being formed as a modulated optical beam. In another embodiment, the tag is provided in the form of an RF tag, the interrogation signal comprising a modulated RF transmission.

39 Claims, 8 Drawing Sheets

METHOD AND APPARATUS FOR STORING AND READING DATA

CROSS-REFERENCE TO RELATED APPLICATION

This application is a Continuation-In-Part of U.S. patent application Ser. No. 08/978,608, filed Nov. 26, 1997, now abandoned, which was a Continuation of U.S. patent application Ser. No. 08/533,568, filed Sep. 25, 1995, now abandoned.

TECHNICAL FIELD

The present invention relates to readable and/or writable tags having memory capabilities.

BACKGROUND OF THE INVENTION

Several methods are used for tracking and providing information about items. For example, inventory items in stores typically bear printed labels providing information such as serial numbers, price, and size. Some such labels include printed symbols, such as bar code symbols which may be selected from a variety of symbologies, so that they may be read optically. Such labels contain a very limited amount of information and are not easily updated, typically requiring the label to be reprinted if it is to be modified.

An alternative method of tracking and providing information about devices uses parasitic power memories. Parasitic power memories are commercially available devices having a single input line and a low power memory device, typically used as tags for inventory control and identification. An example of such devices is found in the DS199x series of Touch Memory devices available from Dallas Semiconductor Corporation.

In operation, parasitic power memories are usually read using a special electronic reader that physically contacts the parasitic power memory and forms an electrical connection to the parasitic power memory. The reader supplies a 5 V signal to power the parasitic power memory and outputs a coded signal (polling code) to access the parasitic power memory. When the parasitic power memory receives the polling code and the power input, it outputs data serially to the reader or accepts data from the reader. A further discussion of the structure and operation of such devices is found in the Book of DS199x Touch Memory Standards and the release 50 Ways to Touch Memory, each by Dallas Semiconductor and each of which is incorporated herein by reference.

Such memories disadvantagnously require the reader to physically contact the memory to provide power, input the polling code and output the data. Also, the reader must be programmed with a priori knowledge of the particular parasitic power memory, such as control information, including the proper polling code and data transfer protocol. There is no simple mechanism for the reader to obtain control information from the memory itself.

SUMMARY OF THE INVENTION

An apparatus for processing information about numerous items includes a plurality of memory tags and a reader. Each memory tag is associated with a machine readable symbol where a portion of the machine readable symbol represents information such as control information about the memory tag. Each tag includes a substrate physically associated with a respective one of the items. The substrate carries a memory, a detector and an emitter coupled to the memory. The detector and emitter are responsive to an interrogation signal from a reader to read and transmit from, or read and store data to, the memory. The interrogation signal encodes a polling code based on the control information retrieved from the machine readable symbol. The tags may be powered by an internal electrical power source carried by the substrate, such as a battery or solar cell, or by an external power source, such as is the case for parasitic power memories. The reader includes a reading section for optically reading the machine readable symbol associated with the substrate and a writing portion for producing an interrogation signal for detection by the detector of the substrate. The reader, upon reading the control information from the tag, modulates the interrogation signal in response to the control information to produce a signal readable by the detector.

In a first exemplary embodiment, the tags are provided in the form of optically actuable tags and the reader is provided in the form of a scanning bar code symbology reader for reading the machine readable symbol and interrogating the memory tag. The scanning bar code reader has an optical source producing a beam of light, a scanner for scanning the beam of light through a predetermined angular range and an optical detector for detecting light reflected from the symbol. In this exemplary embodiment, the optical source is also used to produce the interrogation signal in the form of a stationary optical beam for communicating with the optically actuable tag. To produce a stationary optical beam, the scanner in the scanning reader is halted at a predetermined orientation such that the optical beam is emitted along a predetermined path from the reader. The beam is modulated to produce a polling code to actuate the optically actuable tag for reading and/or writing.

In a second exemplary embodiment, the tags are provided in the form of radio frequency (RF) actuable tags. The reader includes a bar code scanner, employing a fixed illuminating beam and a photodetector capable of electronically scanning the returned beam, such as a charge coupled device (CCD) for reading the machine readable symbol. The reader in this embodiment also includes an RF transmitter and RF receiver for communicating with the RF tags. The RF transmitter modulates an RF signal to encode a polling code that is based on a key encoded in the symbol. The RF receiver receives a data signal returned from the RF tag. Selected data stored in the memory of the tag is transmitted to the reader via the modulation of the data signal. One skilled in the art will note that it is possible to substitute ambient light for the illuminating beam.

The RF tags generally include a substrate which may enclose an antenna and an integrated circuit having analog RF circuits and digital logic and memory circuits. The RF tags may also include a collection of discrete components, such as capacitors and diodes, a substrate for mounting the discrete components and interconnections between the components where such is advantageous. The RF tags are may be either passive or active devices. Active devices are self-powered, by a battery for example. Passive devices do not contain a power source, but derive their energy from the RF signal used to interrogate the tag. Passive RF tags usually include an analog circuit which detects and decodes the interrogating RF signal and which provides power from the RF field to a digital circuit in the tag. The digital circuit generally executes all of the functions performed by the RF tag, such as retrieving stored data from memory and modulating the RF signal to transmit the retrieved data. In addition to retrieving and transmitting data previously stored in memory, the RF tags may permit new or additional information to be stored into the RF tag's memory, or may permit the RF tag to manipulate data or perform some additional functions.

DETAILED DESCRIPTION OF THE INVENTION

A method and system for storing and retrieving data from a memory is described in detail herein. In the following description, numerous specific details, such as particular memory devices, machine readable symbologies and readers are presented in order to provide a through understanding of the present invention. One skilled in the relevant art, however, will readily recognize that the invention can be practiced without using the specific details described herein, or with other specific steps or hardware. Well-known structures and steps are not shown or described in detail in order to avoid obscuring the present invention.

Figure 1:
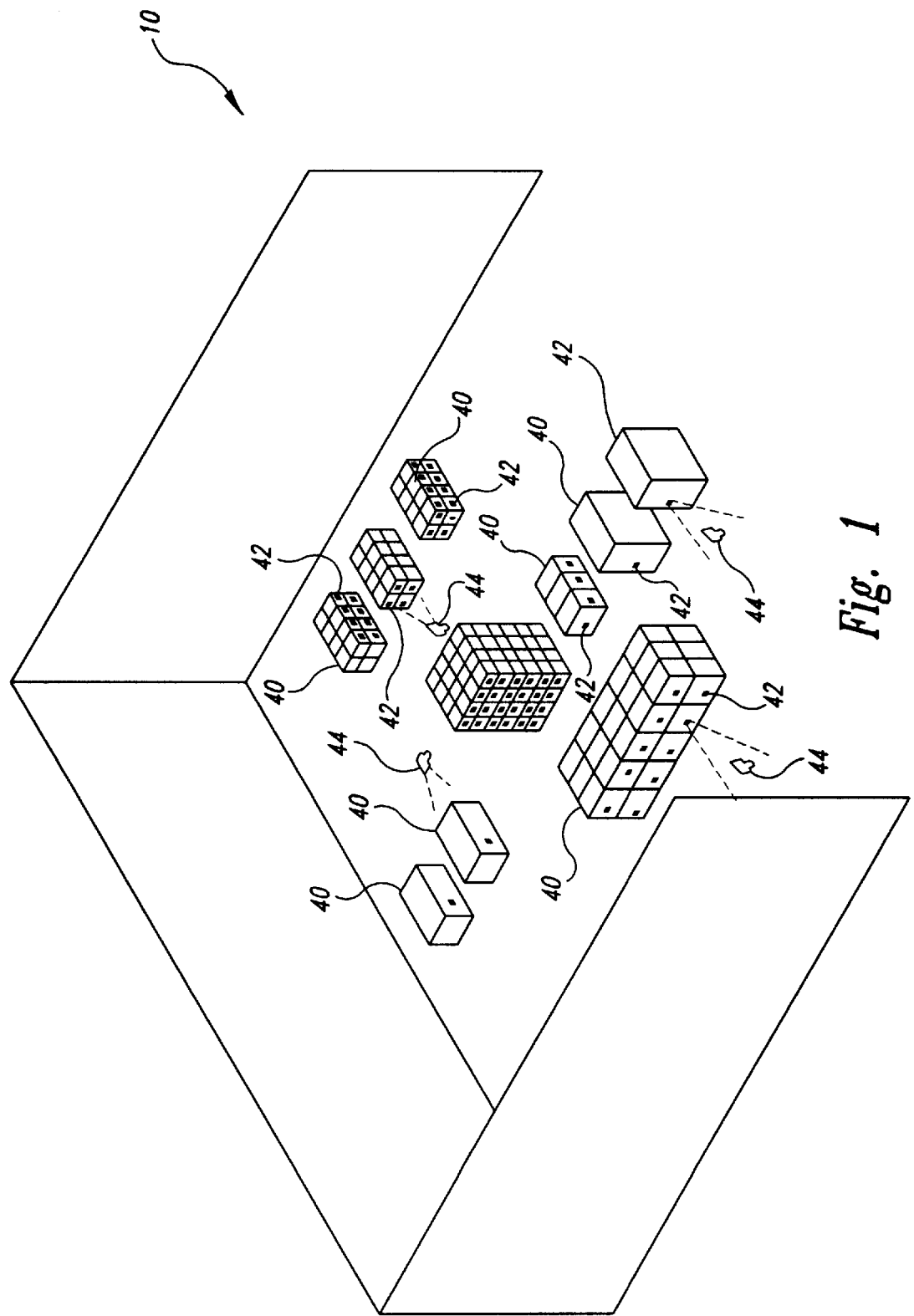
FIG. 1 is an isometric view of a facility containing target objects bearing memory tags.

A facility 10 containing several target objects 40 is shown in FIG. 1. Each of the target objects 40 may be one of a number of types of items, such as items of inventory in a warehouse or container, automobiles in a shipping yard, books in a library, packages in a courier system or any of a wide range of other items. Each of the target objects 40 bears a memory tag 42 which identifies the target object and provides other information about the target object. Information is transmitted to and from the memory tags 42 by hand-held tag readers 44 which communicate with the memory tags 42. In a first exemplary embodiment, the memory tags 42 are optically actuable photonic tags 42, being responsive to a modulated optical signal or beam. In a second exemplary embodiment, the memory tags 42 are RF tags, being responsive to a modulated RF signal or beam. The structure and operation of the photonic tags 42 with respect to the first exemplary embodiment will be described first.

Figure 2:
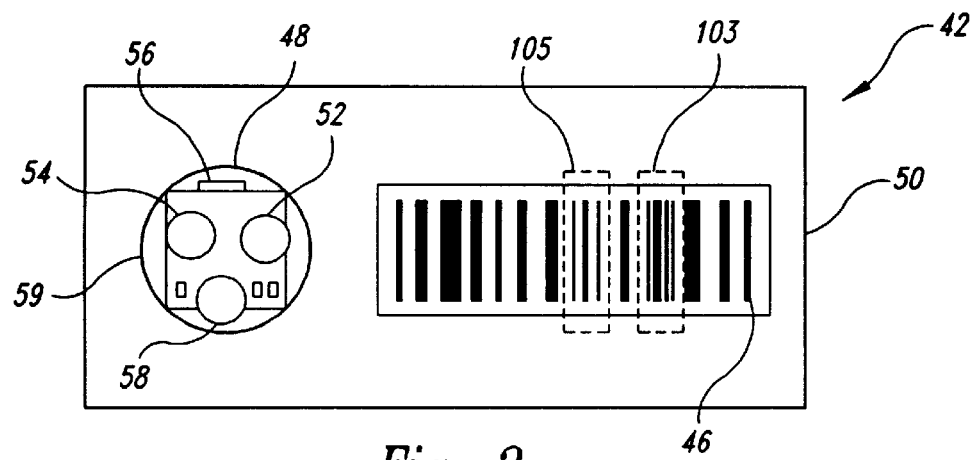
FIG. 2 is a top plan view of a photonic tag incorporating an optically readable symbology and an optically readable and writable memory device.

A preferred embodiment of one of the memory tags 42 is shown in FIG. 2 as a photonic tag 42 having two primary components, a symbol 46 and a photonic memory 48, both carried by a substrate 50. The substrate 50 is a substantially planar platform upon which the symbol 46 is printed and to which the photonic memory 48 is attached. The substrate 50 is adapted for repeatable attachment and detachment to various target objects 40 using known attachment means, such as Velcro™, so that the photonic tags 42 are reusable. As seen in FIG. 1, the photonic tags 42 are attached to a visible surface of the target objects 40 so that they may communicate optically with the readers 44.

The symbol 46 is a pattern of regions of varying reflectance on an exposed portion of the substrate 50 that reflects some of the light from an illumination source back toward one of the readers 44. Numerous types of symbologies are known and may include bar codes such as UPC, EAN, Code 39 and Code 93, "multi-row" or "stacked" symbologies such as PDF-417 and Code 49, and "area" symbologies such as Code 1. A bar code is the symbol 46 illustrated in FIG. 2.

Figure 3:
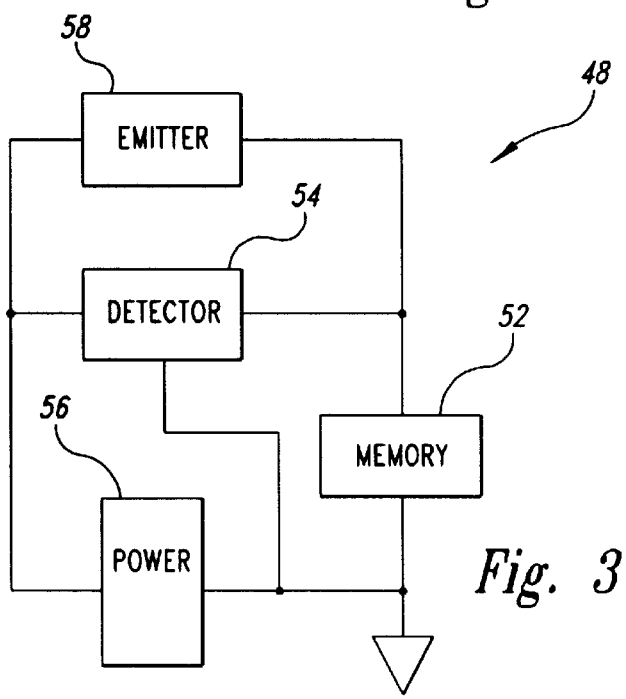
FIG. 3 is a block diagram of a photonic memory of the photonic tag of FIG. 2.

The photonic memory 48 is an optically readable and writable memory device positioned adjacent the symbol 46 on the substrate 50 and is presented in block diagram form in FIG. 3. The photonic memory 48 includes a memory device 52 having its housing grounded, an optical detector 54, a power source 56, and an optical emitter 58. The memory device 52 is a serially readable, single-wire memory device, such as one of the DS199x series of Touch Memory™ devices from Dallas Semiconductor. Such devices have a single terminal used for data input and data output, as well as power input. The housing of the memory device 52 is grounded to provide a signal reference. A microprocessor (not shown) within the memory device 52 controls data transfer and electrical operation of the memory device 52 in a manner known in the art using a manufacturer-identified protocol.

The optical detector 54 is positioned (see FIG. 2) to receive light from a source external to the photonic memory 48 and is connected to provide input to the memory device 52 through an input terminal. The optical emitter 58 is oriented to emit light outwardly from the photonic memory 48 and is connected to be controlled by the memory device 52 to provide an optical output of the photonic memory 48. The power source 56 is a battery connected to provide power to the memory device 52, the optical detector 54, and the optical emitter 58.

While the preferred embodiment employs a battery as the power source 56, other types of power sources are within the scope of the invention. For example, solar cells may be used where an expected lifetime of the battery 56 is inadequate. The relatively large area of the symbol 46 and the generally planar structure of the substrate 50 allow the solar cell to be integrated easily into the photonic tag 42. While such solar cells would typically draw power from ambient light or sunlight, in low light environments the solar cell can convert light energy supplied by the reader 44 into electrical power for the photonic memory 48.

Figure 4:
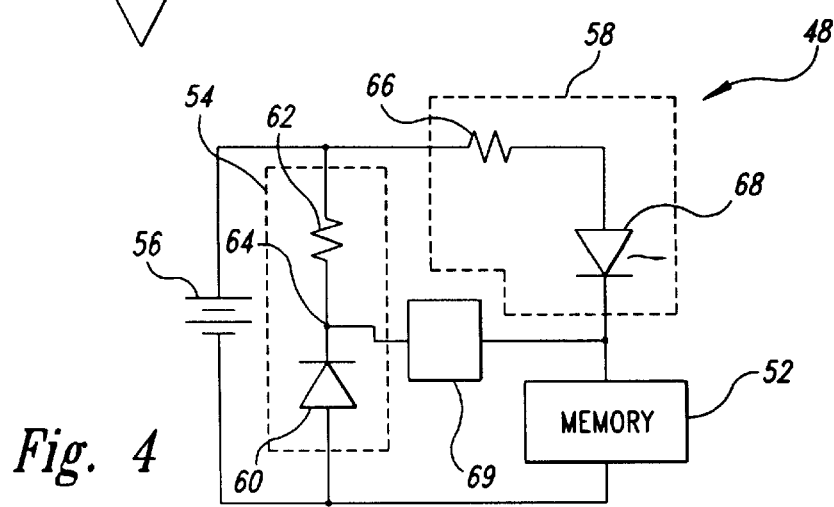
FIG. 4 is a simplified circuit structure of the photonic memory of FIG. 3.

FIG. 4 shows one circuit for realizing the photonic memory 48 of FIG. 3, where the optical detector 54 is formed by a combination of a photodiode 60 and a biasing resistor 62 serially coupled between the terminals of the power source 56. The memory device 52 is connected in parallel to the photodiode 60 through an isolation element 69 at a node 64 and thus receives power from the power source 56 through the biasing resistor 62. Because the photodiode 60 is reverse-biased, current is blocked from flowing through the serially coupled photodiode 60 and biasing resistor 62. Because the memory device 52 does not draw significant current, except when activated, the current through the biasing resistor 62 will be negligible and the voltage at the node 64 will be substantially equal to the voltage of the power source 56.

As is known, in response to an optical signal, the reverse-biased photodiode 60 will draw current causing current to flow through the biasing resistor 62. The voltage at the node 64 will fall in response to the current-induced voltage drop across the biasing resistor 62 producing an electrical signal for input to the memory device 52 on its input terminal through the isolation element 69. If the optical signal is modulated, the electrical signal supplied to the memory device 52 will be correspondingly modulated. By selecting the modulation of the optical signal appropriately, the electrical signal supplied to the memory 52 can be modulated to produce a proper polling signal (i.e., a digital code recognizable by the memory device 52). In response to the proper polling code, the memory device 52 is activated and can be read or programmed according to the protocol specified by the manufacturer.

In the first exemplary embodiment, data transmission from the photonic memory 48 for reading by the reader 44 is realized through optical transmission using the optical emitter 58. The emitter 58 includes a current limiting resistor 66 and a light emitting diode (LED) 68 coupled in series between the positive terminal of the power source 56 and the input terminal of the memory device 52. To output an optical signal, the memory device 52 draws current from the power source 56 through the resistor 66 and the LED 68. In response to the current flowing through it, the LED 68 emits light which is modulated according to the modulation of the electrical signal produced by the memory device 52. When no optical output is desired, the memory device 52 draws substantially no current and the LED 68 emits no light. The isolation element 69 prevents the photodiode 60 from drawing current through the LED 68 and limiting resistor 66.

As described above, communication to and from the photonic tag 42 is realized with the reader 44. The structure and operation of the reader 44 will now be described with reference to FIG. 5. The reader 44 is a portable hand-held device having a head 70 with a reading face 71 and a handle 72 with a trigger 73. The reader 44 advantageously both reads from and writes to the photonic memory 48 through a window 75 mounted at the reading face 71 so that the user does not have to move the reader 44 to perform both the reading and writing functions. Reading of the symbol 46 will be described first.

To read data from the photonic tag 42, a user orients the reader 44 with the reading face 71 thereof facing the photonic tag 42. The user then actuates the trigger 73 to initiate reading. The reader 44 reads the symbol 46 in a conventional manner by illuminating the symbol with a scanning beam, shown by the broken line arrows 77 and detecting the reflected pattern of light energy from the symbol.

The reader 44 produces the scanning beam with a laser diode 74 and a scanning mirror 76, scanned by a scanning motor 78 mounted to a platform 80 located within the head 70 behind the window 75. The laser diode 74 is oriented to emit a beam of light toward the scanning mirror 76. The scanning motor 78 pivots the scanning mirror 76 through a selected angular range such that when the light from the laser diode 74 strikes the scanning mirror, the light is swept through a corresponding angular range, forming the scanning beam. The structure and operation of such combinations for producing scanning beams is known in the art.

As the scanning beam exits the reader 44 through the window 75, it travels to the target one of the photonic tags 42, and strikes the symbol 46. Because the symbol 46 is a pattern of varying reflectances, some of the light is reflected back to the reader 44 in a pattern corresponding to the pattern of the symbol 46. The light reflected from the symbol 46 enters the head 70 through the window 75 and strikes a gathering mirror 84 which gathers the reflected light and redirects it toward a photodetector 86. The light redirected by the gathering mirror 84 is focused on the photodetector 86 by a lens 88 positioned between the gathering mirror and the detector. To reduce the sensitivity of the photodetector 86 to ambient light, a wavelength selective optical filter 90 is placed between the lens 88 and the photodetector 86.

The photodetector 86 converts the reflected light into an electrical signal which is communicated through a cable 92 to a printed circuit board 94 carrying a microprocessor 96. The microprocessor 96 receives the electrical signal from the photodetector 86 and decodes the electrical signal to identify the information represented by the symbol 46.

The data represented by the symbol 46 includes a data sequence indicating to the microprocessor 96 that the photonic tag 42 includes the photonic memory 48. The reader 44, upon reading and decoding the symbol 46 to determine that the photonic tag 42 includes the photonic memory 48 reads the photonic memory 48 as follows.

The microprocessor 96 first halts the scanning motor 78 by sending a halt signal to the scanning motor 78 through a cable 98. In response to the halt signal, the scanning motor 78 stops scanning the scanning mirror 76 with the scanning mirror held in a predetermined orientation. The beam is thus held stationary and can be aligned to the photonic memory 48 by a user adjusting the position and orientation of the reader 44. The stationary beam will be referred to as the communication beam to distinguish it from the scanning beam. After disabling the scanning motor 78, the microprocessor 96 modulates the drive current of the laser diode 74 through the cable 98 causing the laser diode 74 to emit a modulated optical signal. The optical detector 54 receives the modulated optical signal and, in response to the modulated optical signal, produces an electrical signal for input to the memory device 52.

In typical applications, the scanning beam is confined to a narrow cross section as a collimated or focused beam of light. Because the cross section of the scanning beam is small, the communication beam, if unaltered, would also be of small cross section, making it difficult to maintain alignment of the communication beam with the optical detector 54. To aid the user in maintaining alignment of the communication beam with the optical detector 54, the communication beam is broadened using a broadening lens 99 mounted on the window 75. To minimize the effect of the broadening lens 99 on the scanning beam, the broadening lens is placed at the edge of the angular range of the scan. The predetermined location at which the scanning mirror 76 is halted is selected to be at the angular extreme of the mirror's scan, such that the light from the laser diode 74 passes through the broadening lens 99 when the scanning mirror 76 is stationary.

To initiate reading and writing of data, the memory device 52 requires specified data sequences, referred to herein as polling codes. If the data sequence is not a polling code, the memory device 52 will not accept data or commands and will not output data. Initially, therefore, the modulated optical signal from the laser diode 74 corresponds to one of the polling codes.

Figure 6:
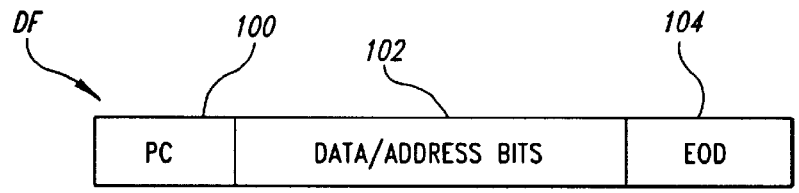
FIG. 6 is a data structure for data transmitted according to the protocol of the photonic tag.

If the memory device 52 receives the polling code corresponding to accepting data, the memory device 52 will accept data. A simple data structure for transmitting data to the memory device 52 is shown in FIG. 6 where the data field DF includes an initial sequence of data bits 100 indicating the polling code PC, a sequence of data and address bits 102 and a sequence of bits 104 representing the end of data EOD.

Because the sequence of data bits 100 representing the polling code may differ for various types of memory devices 52, the symbol 46 advantageously includes a first portion 103 (see FIG. 2) indicating the appropriate polling code for its respective memory device. A second portion 105 (see FIG. 2) of the symbol 46 represents a number ranging from 1 to 8 with each of the numbers 1 through 8 indicating a different device type or data protocol. When the microprocessor 96 decodes the symbol 46, the microprocessor first decodes the first portion 103 of the symbol 46. From the first portion 103, the microprocessor 96 identifies the appropriate polling code for the memory device 52 either using the data from the first portion 103 directly or as an address in a look-up table containing polling codes. The microprocessor 96 then determines, from the number represented by the second portion 105 of the symbol 46, the proper protocol for communicating with the memory device 52 by processing the identified number with a software program in the microprocessor 96. The use of the symbol 46 to convey the polling code and device type allows the reader 44 to read a number of different types of photonic memories 48 having differing polling codes and communications protocols, increasing the flexibility of the overall system. Where a single polling code and single protocol are used for all of the photonic memories 48, the microprocessor 96 may be preprogrammed with the appropriate polling code and protocol, and the first and second portions 103 and 105 of the symbol 46 need not be reserved to indicate the polling code and protocol.

The portion of the symbol 46 not reserved for the first and second portions 103 and 105 contains a portion of the information about the target object 40. For example, where inventory from multiple manufacturers is stored in a facility, all target objects 40 from a particular manufacturer can bear symbologies 46 identifying the manufacturer. Similarly, each item of a single inventory type can bear a symbol 46 identifying the type of inventory item. The respective photonic memory 48 can also contain additional information in an updatable form, such as inventory date and warehouse location.

In addition to optically transmitting data to the photonic memory 48 the reader 44 can also optically read the photonic memory 48. Optical reading of data is best explained with reference to FIG. 5.

As shown by the broken line arrows 106, the photonic memory 48 emits light outwardly as discussed above. The light is emitted over a sufficiently large solid angle such that it is likely to strike the reader 44. When light from the photonic memory 48 strikes the reader 44, some of the light is received by the light gathering mirror 84 and focused onto the photodetector 86. As with the light from the scanning beam, light from the photonic memory 48 is converted by the photodetector 86 into an electrical signal which is communicated to the microprocessor 96. The microprocessor 96 decodes the electrical signal to identify the data transmitted by the photonic memory 48 to the reader 44.

Because communication between the reader 44 and the photonic tag 42 is bidirectional, an appropriate communication protocol is chosen to minimize interference between the respective signals. In one embodiment, the memory device 52 utilizes a manufacturer-specified protocol in which separate, distinct polling codes are used to initiate reading, writing, and programming of commands. Other reading and writing protocols may be realized by one of skill in the art, including but not limited to data encryption such as a public key data encryption employing the Data Encryption Standard (DES).

Figure 7:
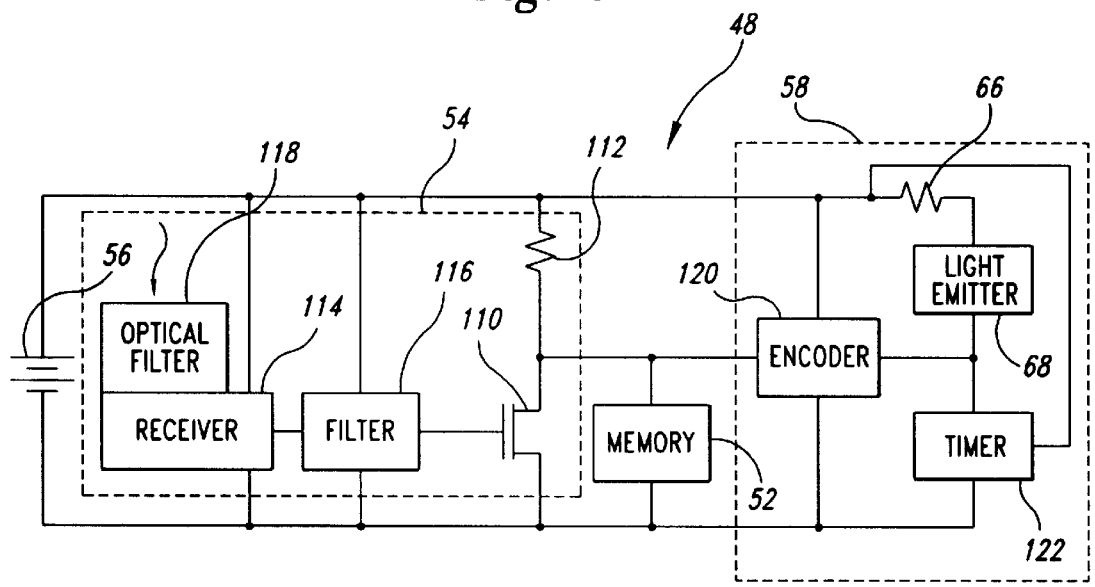
FIG. 7 is a schematic drawing of an alternative embodiment of the photonic tag incorporating an optical filter, and a timer and encoder circuit.

An alternative structure for the photonic memory 48 is presented in FIG. 7. In this embodiment, the optical detector 54 includes an optical receiver 114 which receives light through a filter 116. The receiver 114 may be a photodiode, phototransistor or other known optical detector. The filter 116 removes DC components resulting from ambient light incident upon the receiver 114, and may also serve to reduce spurious signals from the receiver 114. The filter 116 is preferably a passive, band pass filter, though an active filter and/or high-pass filter may be used depending upon the power consumption and frequency limitations of the memory device 52 and the reader 44. To further minimize the effects of ambient light, an optical filter 118 overlays the receiver 114. The optical filter 118 is a wavelength selective filter that preferentially passes light at the wavelength of the laser diode 74 (FIG. 5) and blocks light at other wavelengths.

When modulated light from the reader 44 strikes the optical filter 118, the optical filter 118 transmits the light to the receiver 114. The receiver 114, in response to the light transmitted by the optical filter 118, produces an electrical signal which is input to the filter 116. The filter 116 removes undesirable electrical components from the signal. The output from the filter 116 is used to drive the gate of a MOS transistor 110 biased through a bias resistor 1112 connected to the source of the transistor 110. In response to the output from the filter 116, an output voltage is produced at the source of the transistor 110 corresponding to the modulation of the optical signal from the reader 44. The output signal from the source of the transistor 110 is coupled to the memory device 52 to write to the memory device 52 or activate the memory device for reading as described above.

As with the embodiment of FIG. 4, the photonic memory 48 in the embodiment of FIG. 7 emits light with the optical emitter 58. As above, the optical emitter 58 includes the LED 68 and the current limiting resistor 66 serially connected to the power source 56. To reduce power consumption by the LED 68, the optical emitter 58 also includes an encoder 120 coupled between the memory device 52 and the LED 68 and a timer 122 coupled between the LED and the negative terminal of the power source 56.

Figure 5:
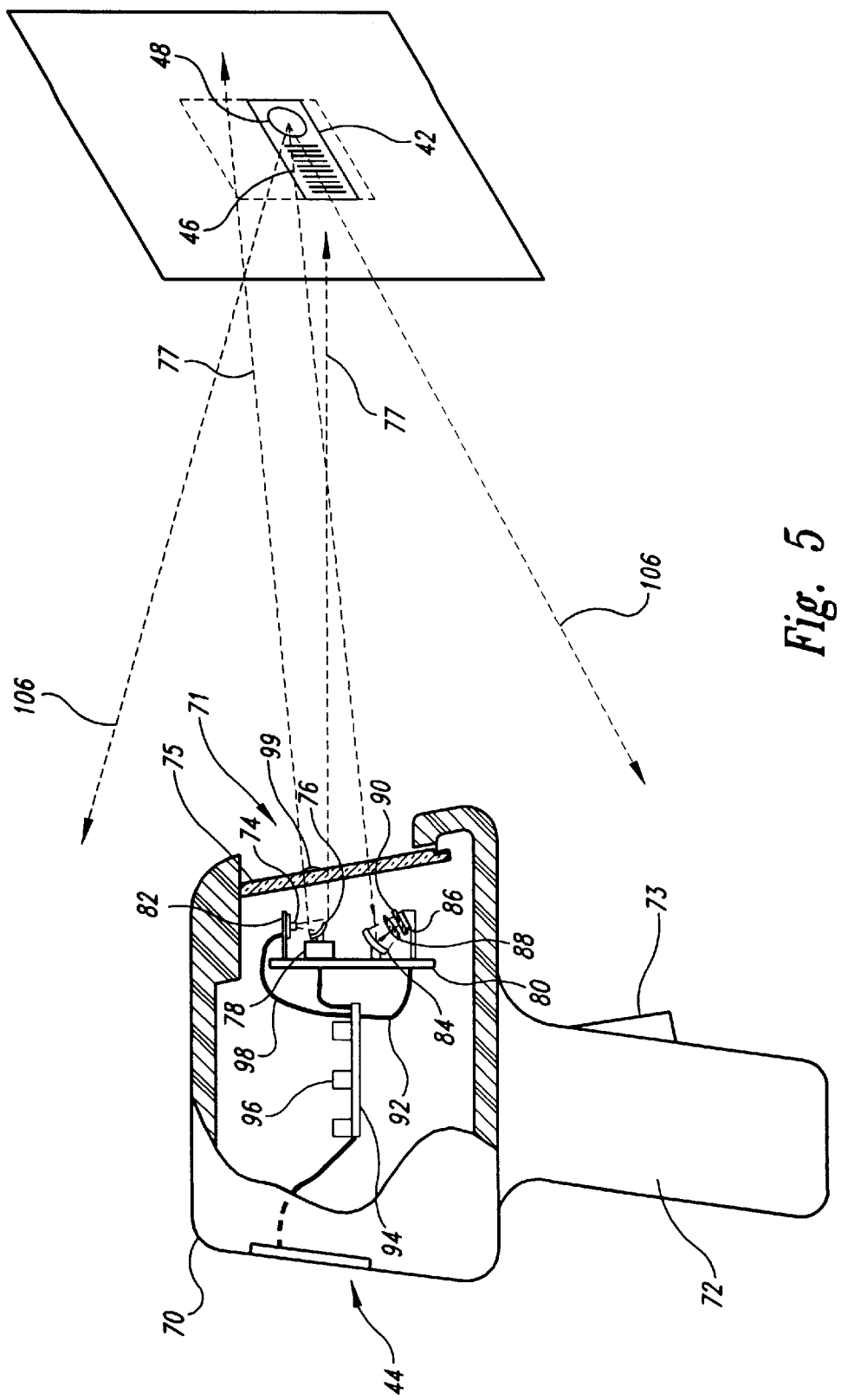
FIG. 5 is a side cross-sectional view of a data reader and a photonic tag according to the first exemplary embodiment of the present invention showing bidirectional optical communication.

In operation, the encoder 120 accepts and holds data from the memory device 52 for use in driving the LED 68. The timer 122 produces clock pulses to activate the encoder 120. In response to the pulses from the timer 122, the encoder 120 draws current through the LED 68 in a sequence corresponding to the data retrieved from the memory device 52. In response to the current drawn by the encoder 120, the LED 68 emits light for detection by the reader 44 (FIG. 5). Because the encoder 120 controls light emission from the LED 68 in response to the timer 122, the frequency and duration of the data signal from the LED 68 can be varied to reduce power consumption. Also, the optical signal corresponding to the data retrieved from the memory device 52 may be repeated several times to reduce data loss.

The second exemplary embodiment will be discussed with reference to FIGS. 8–10, wherein the memory tags are formed as RF tags 42'. The preferred embodiment of the RF tag 42' is shown in FIG. 9 as having two primary components, a symbol 46 and an RF memory 200, both carried by a substrate 50. As was the case for the photonic tags 42, the substrate 50 is a substantially planar platform upon which the symbol 46 is printed and to which the RF memory 200 is attached. The substrate 50 is adapted for repeated attachment to various target objects 40.

Figure 8:
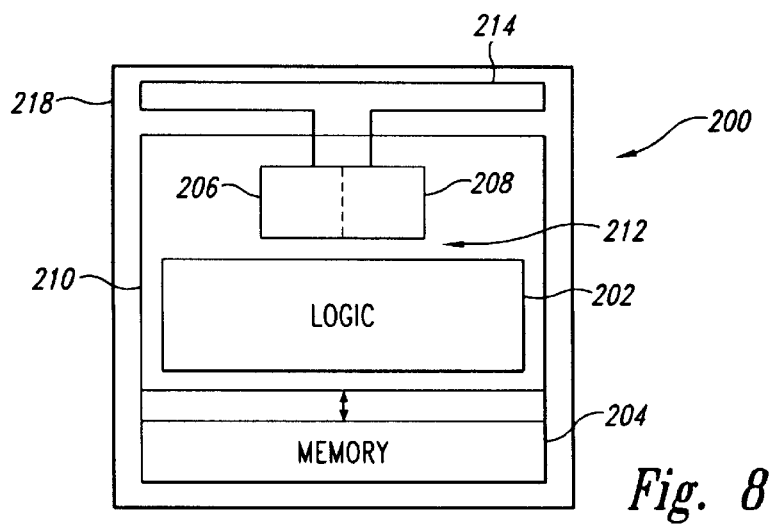
FIG. 8 is a block diagram of an RF memory of an RF tag.
Figure 9:
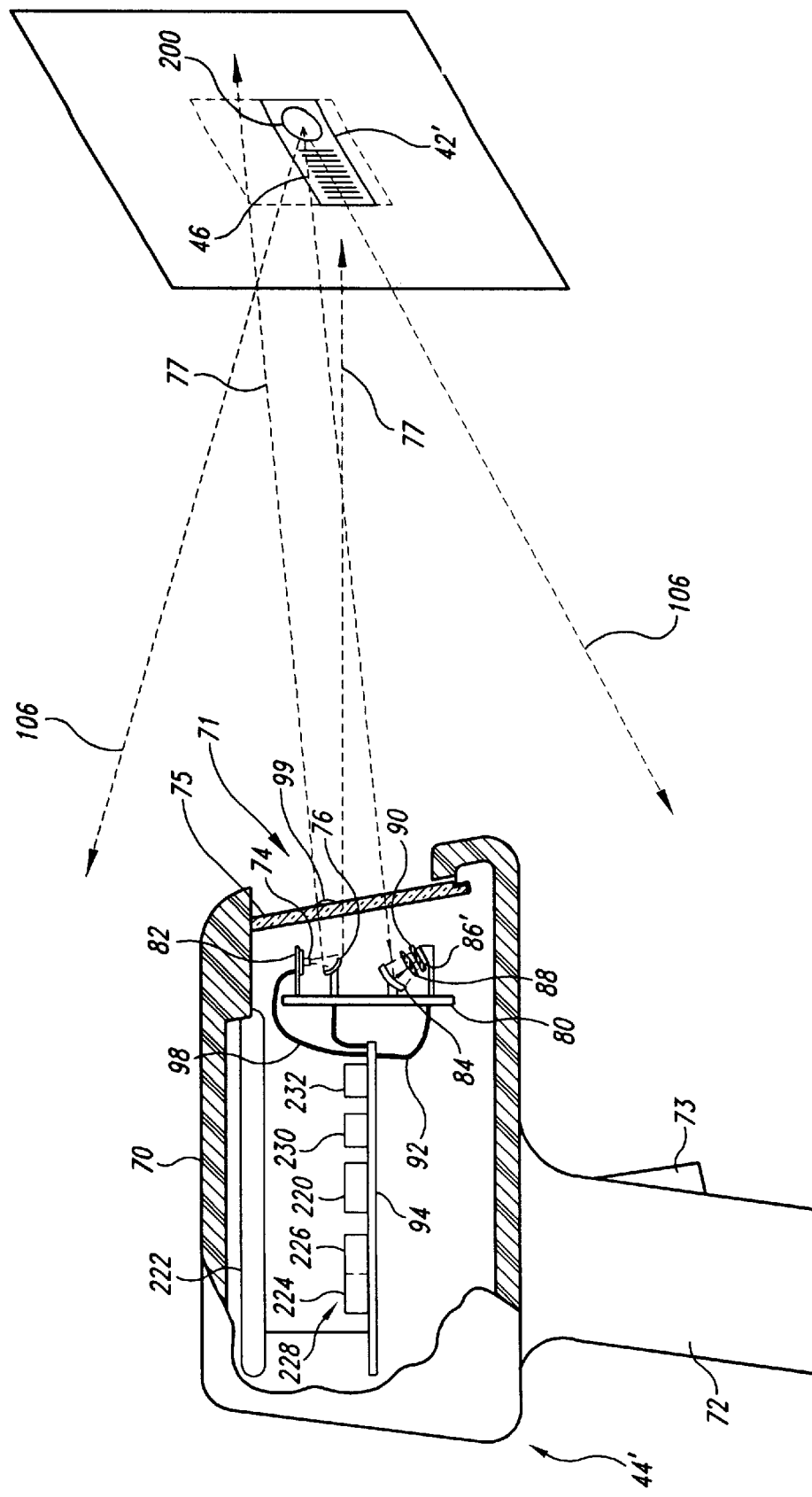
FIG. 9 is a side cross-sectional view of a data reader having an RF section, and an RF memory tag according to a second exemplary embodiment of the present invention.

A passive RF memory 200 is shown in block diagram form in FIG. 8. The RF memory 200 includes a logic 202 and a memory 204, an RF detector 206, and an RF emitter 208 all coupled by the logic 202. In the preferred embodiment, the RF detector 206 and the RF emitter 208 are integrally formed in an integrated circuit 210 as an RF transceiver 212 which is coupled to a common antenna 214. Alternatively, the RF detector may be provided as an RF receiver coupled to an antenna, while the RF emitter may be provided as an RF transmitter coupled to a separate antenna (not shown).

The integrated circuit 210 may include an analog circuit comprising the RF transceiver 212, and a digital circuit comprising the logic 202 and the memory 204.

The logic 202 may be provided in the form of microcode or as a hardwired circuit. The RF detector 206 is used to convert an RF signal received from the antenna 214 to a DC voltage which powers up the logic 202 and transmits information and commands for storing and retrieving data from the memory 204. The digital circuit generally executes all of the functions performed by the RF memory 200, such as retrieving stored data from the memory 204 and modulating the RF signal to transmit the retrieved data. A protective housing 218 encloses the components. While the RF tag 42' shown is a passive device, a self-powered active device may employed. The logic 202, in the form of a microprocessor or microcontroller, controls data transfer and electrical operation of the RF memory 200 in a manner known in the art using a manufacture-identified protocol.

Communication to and from the RF tag 42' is realized with the reader 44'. The structure and operation of the reader 44' of the second exemplary embodiment will now be described with reference to FIG. 9.

The RF tag reader 44' includes a symbol reader section for reading the symbol 46 on the RF tag 42'. In the second exemplary embodiment, the symbol 46 is read in much the same manner as in the first exemplary embodiment, although an alternative structure will be disclosed for the symbol reader section. The user orients the reader 44' with the reading face 71 thereof facing the RF tag 42'. The user then actuates the trigger 73 to initiate reading. The reader 44' reads the symbol 46 in a conventional manner by illuminating the symbol 46 with a beam, shown by broken line arrows 77, and detecting the reflected pattern of light energy from the symbol 46, shown as broken line arrows 77' (FIG. 10).

The reader produces the illuminating beam with one ore more laser diodes 74. The illuminating beam is directed out of the reader, often with the assistance of mirrors 76 and lens 99. While a scanning mirror and scanning motor similar to that of the first exemplary embodiment could be employed, the second exemplary embodiment instead employs a fixed illumination beam and electronic means for scanning the returned beam. The laser diodes 74 are oriented to emit a beam of light out the window 75 in the head 70 of the reader. The structure and operation of such combinations for scanning symbols is known in the art.

As the illumination beam exits the reader through the window 75, it travels to the target, one of the RF tags 42', and strikes the symbol 46. Because the symbol 46 is a pattern of varying reflectances, some of the light is reflected back to the reader in a pattern corresponding to the pattern of the symbol 46. The light reflected from the symbol 46 enters the head 70 through the window 75 and strikes a gathering mirror 84 which gathers the reflected light and directs it toward a photodetector 86'. A lens 88 may focus the light reflected from the gathering mirror 84 onto the photodetector 86'. To reduce the sensitivity of the photodetector 86' to ambient light, a wavelength selective optical filter 90 may be placed between the lens 88 and the photodetector 86'.

In the second exemplary embodiment, the photodetector 86' takes the form of a linear array of photosensitive elements, preferably a charged coupled device ("CCD") having, for example, linear active surface pixel elements. Other known imagers may be used, such as vidicons, two-dimensional semiconductor arrays, or a two-dimensional CCD array. Additionally, other size CCD arrays may be used, for example, circular or square CCD arrays. The pixel element array defines a field of view of the reader head 70.

As is known, each pixel element in the linear CCD array 86' outputs a gray level signal, i.e., an analog signal that determines the amount of intensity of light impinging upon the particular pixel element. Alternatively, each pixel element in the linear CCD array 86' can output the signal that indicates the gray intensity value of the particular pixel element. In an exemplary embodiment, each pixel element has an intensity value ranging between 0 and 15, or 0 and 255, ranging between black and white. The signals output from the linear CCD array 86' are similar to video data.

While the exemplary embodiment of the photodetector 86' is of a linear imager, those skilled in the relevant art will readily recognize that other image digitizing or capture devices can be employed, including color sensitive equipment. Electronic means may be employed to selectively sample each of the pixel elements of the photodetector 86' to effectively scan the symbol 46. This eliminate s the need for a scanning illumination beam, and the equipment to produce such a scanning illumination beam. Thus, the symbol reader section may be significantly simplified by reducing the number of moving parts.

The photodetector 86' converts the reflected light into an electrical signal which is communicated to a printed circuit board 94 carrying a microprocessor 220. The microprocessor 220 receives the electrical signal from the photodetector 86' and decodes the electrical signal to identify the information represented by the symbol 46.

As discuss ed in reference to the first exemplary embodiment, the data encoded in the symbol 46 includes a key which is logically associated with a code for activating and operating the respective RF tag 42'.

In the second exemplary embodiment, the reader 44 also includes an RF section for communicating with the RF memory 200 of the RF tag 42' and for defining an RF tag reader 44'. The RF tag reader 44' includes an antenna 222 which is coupled to a transmitter 224. In this embodiment, the transmitter 224 includes a receiver 226 to form a radio frequency transceiver 228, although the transmitter and receiver could be provided as separate components, each coupled to a respective antenna. The microprocessor 220 is coupled to the transceiver 228 for controlling the operation of the transmitter 224 and receiver 226, as well as for receiving the data signal received by the receiver 226 portion of the transceiver 228. A memory in the form of a read only memory (ROM) 230 is coupled to the microprocessor 220 for storing programs and data for the microprocessor 220 to execute. A memory in the form of a random access memory (RAM) 232 is also coupled to the microprocessor 220 for providing storage for data received by the receiver 226 and decoded by the microprocessor 220. Power for these components may be supplied via a power bus (not shown), from an external power supply, or from an internal power supply, such as a set of batteries (not shown).

Figure 10:
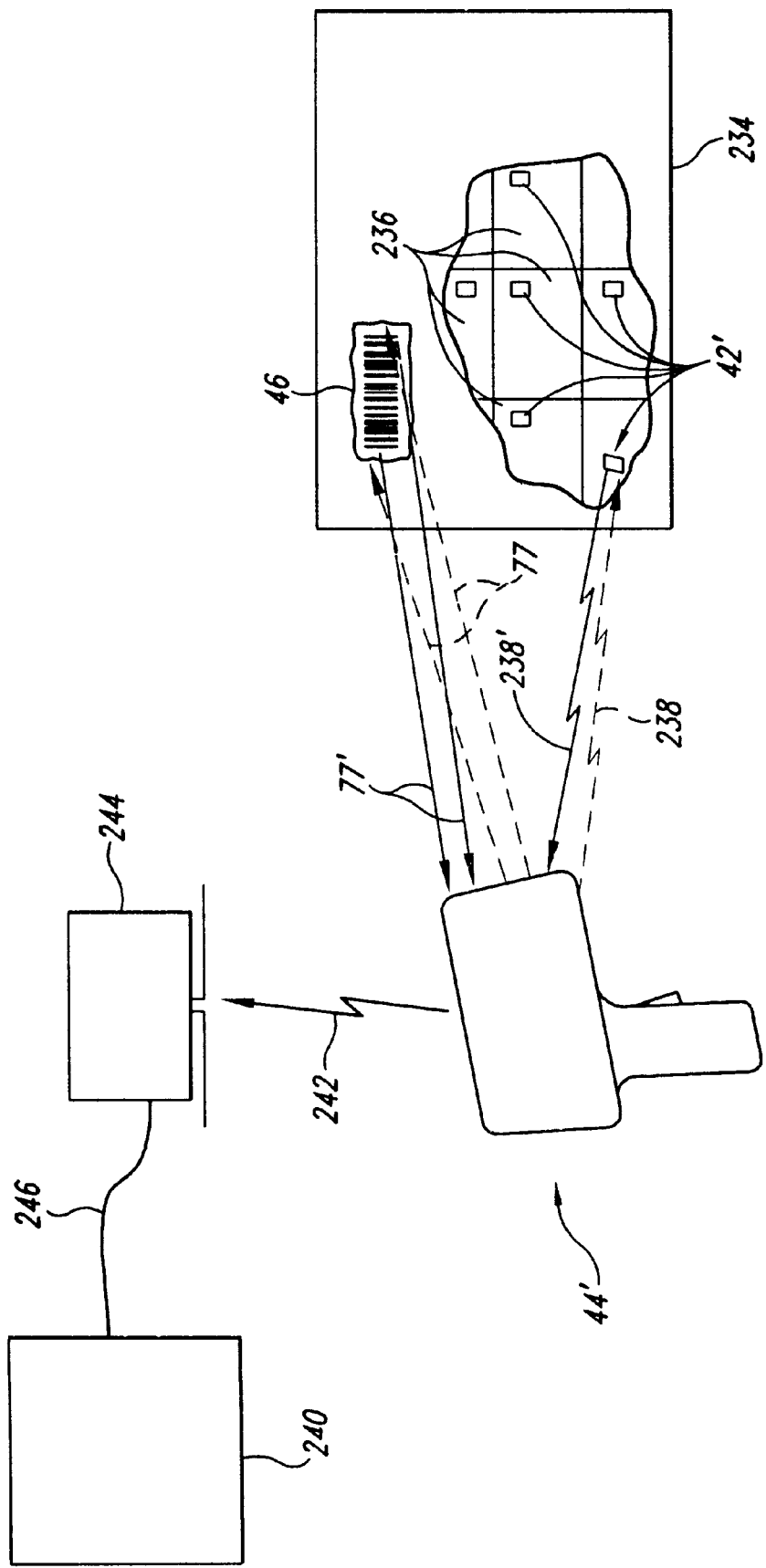
FIG. 10 is an isometric view of the reader of FIG. 9 used to take inventory of the contents of a container and to relay the inventory to an external system.

With reference to FIG. 10, the RF tag reader 44' is shown for performing inventory data collection by retrieving data encoded in a data encoding article, such as the RF tag 42' located, for example, in a carton, box or container 234. The reader illuminates a symbol 46 located on the exterior of the container 234 with a beam, shown by the broken arrows 77. The symbol 46 may encode keys or data identifying for each of a number of items 236 that are supposed to be in the container 234. Alternatively, a separate symbol (not shown) may be provided for each of the items that is supposed to be in the container 234.

The photodetector 86' (FIG. 9) of the reader 44' detects the returned beam, shown by the solid arrows 77', and converts the returned beam into electrical signals. The microprocessor 220 (FIG. 9) converts the electrical signals into a series of keys, each key related to a one of the plurality of items 236 that are supposed to be stored in the container 234. The RF tag reader 44' generates an interrogation signal in a form of a radio frequency transmission, shown as broken zigzag line 238. The interrogation signal is modulated to encode a polling code therein for corresponding to a particular RF tag 42', or for avoiding confusion with stray RF emissions.

Upon receipt of the interrogation signal, the RF tag 42' samples or examines the polling code. If the polling code corresponds to the particular RF tag 42', then the RF memory 200 (FIG. 9) generates and transmits a data beam 238', in the form of a radio frequency transmission, shown as solid zigzag line 238', which is modulated to transmit the data or information contained in the RF tag's memory 204 (FIG. 8). Upon receipt of the data beam 238', the receiver 226 (FIG. 9) converts the data beam 238' into a series of electrical signals. The microprocessor 220 (FIG. 9) converts the electrical signals generated by the receiver 226 into data, which is stored in the RF tag's reader's memory 230 (FIG. 9). In this way, it may be determined whether the closed or scaled container 234 actually contains each item 236 that it is supposed to contain, as identified by the symbol 46 carried on the side of the container 234. Thus large containers holding a large number of items may be quickly and accurately inventoried without having to break any security seals, or without having to actually handle each item.

As the occasion arises, or whenever the memory 230 becomes full, the user may download the data stored in the memory 230 to an external device, such as a computer network 240. The user may do so by operating the trigger 73 on the RF tag reader 44'. The microprocessor 220 will retrieve the data stored in the memory 230, and cause the transmitter 224 and antenna 222 to generate a communication signal 242. The communication signal 242 again takes the form of a modulated radio frequency transmission. The communication beam 242 is received by a receiver and antenna combination 244, which converts the communication signal 242 to data for delivery to the computer network 240, for example over a transmission line 246. Different identification data, such as the polling signal, may be encoded in each of the interrogation signal 238, the data signal 238' and the communication signal 242 to prevent one transmission from being mistaken for the other transmission.

Figure 11:
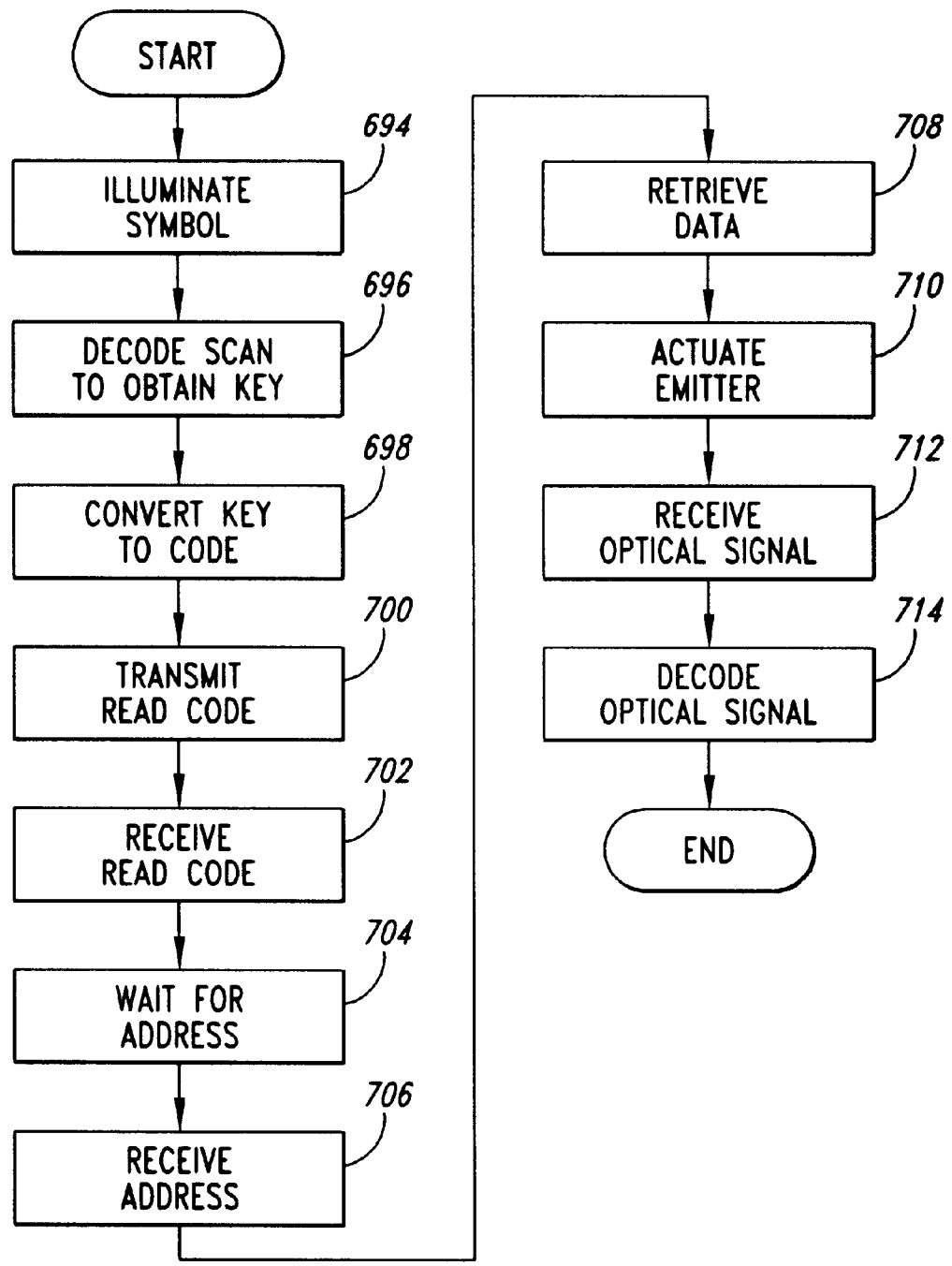
FIG. 11 is a flowchart showing the steps for reading data from the photonic tag.

The steps for reading data from the memory tag 42, 42' are represented by the flowchart of FIG. 11. In step 694, the reader 44, 44' illuminates the symbol 46 associated with the memory tag 42, 42' with a beam of light. The beam of light is modulated by the varying reflectances of the symbol 46 and is reflected back to the reader 44, 44'. Upon receipt of the returned light by the photodetector 86, 86', the microprocessor 96, 220 in step 696, interprets the returned beam to identify a key encoded in the symbol 46. In step 698, the microprocessor 96, 220 can obtain a polling code from, for example, the memory 232 based on the key. The reader 44, 44' in step 700 transmits the polling code corresponding to reading data as discussed above. Upon receiving a polling code indicating reading in step 702, the memory device 52, 204 awaits a memory address in step 704. Upon receiving the memory address from the reader 44, 44' in step 706, the memory device 52, 204 in step 708 retrieves data from the received memory address and in step 710 activates the emitter 58, 208 to emit a data signal representing the retrieved data. In step 712, the reader 44, 44' receives the data signal and, in step 714, decodes the data signal to identify the data retrieved from the location indicated by the memory address.

Figure 12:
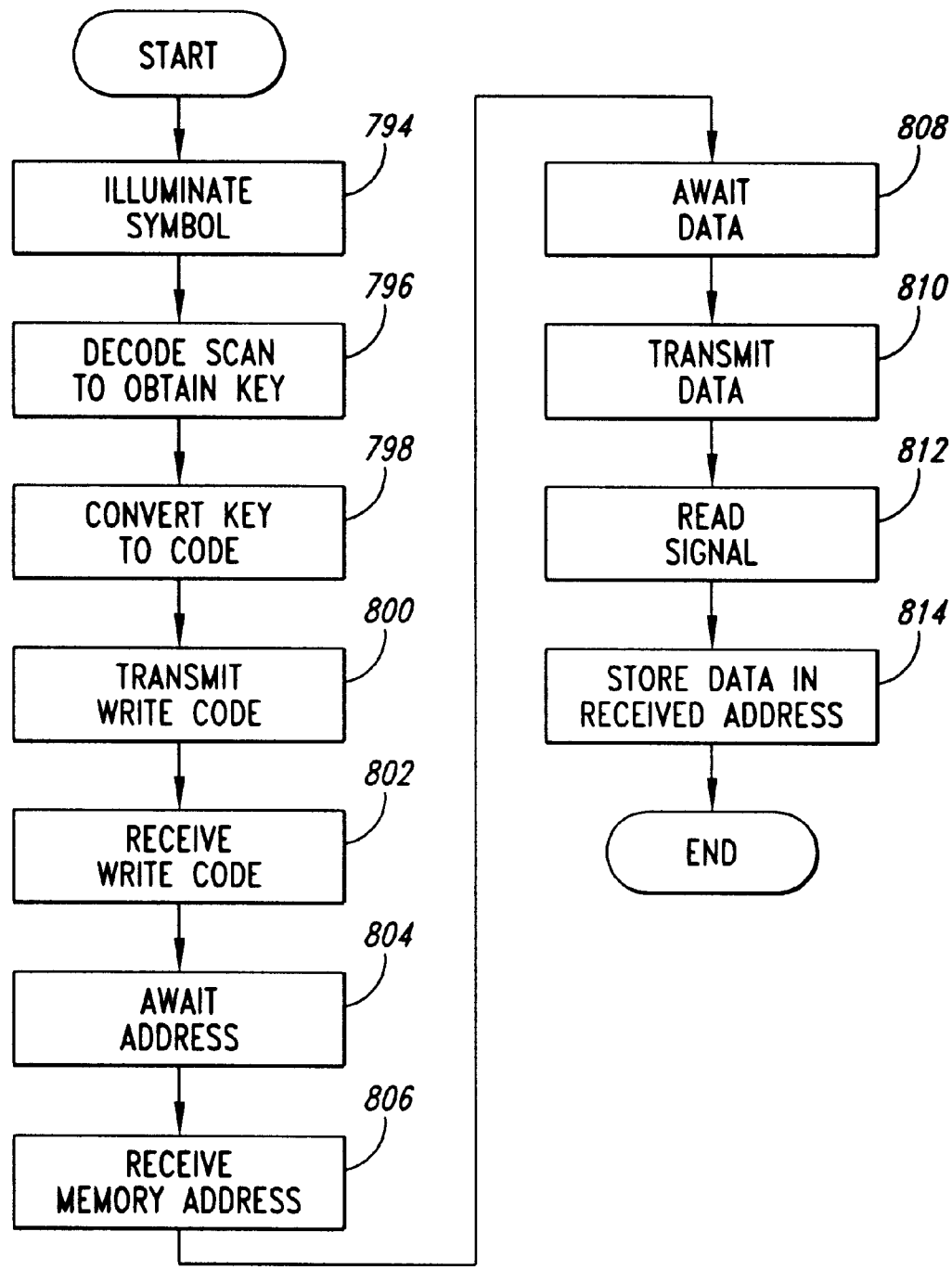
FIG. 12 is a flowchart showing the steps for writing data to the photonic tag.

The steps for writing data to the memory tag 44, 44' are represented by the flowchart of FIG. 12. In step 794, the reader 44, 44' illuminates the symbol 46 associated with the memory tag 42, 42' with a beam of light. The beam of light is modulated by the varying reflectances of the symbol 46 and is reflected back to the reader 44, 44'. Upon receipt of the returned light by the photodetector 86, 86', the microprocessor 96, 220 in step 796, interprets the returned beam to identify a key encoded in the symbol 46. In step 798, the microprocessor 96, 220 can obtain a polling code from, for example, the memory 232 based on the key. The reader 44, 44' initiates writing in step 800 by transmitting a polling code corresponding to writing to the memory device 52. The polling code is received by the memory device 52 in step 802. When the memory device 52 determines that the polling code from the reader 44 represents a write data command, the memory device 52 awaits a memory address from the reader 44 in step 804. Upon receiving the memory address in step 806, the memory device 52 awaits data from the reader 44 in step 808. The reader 44 then transmits the data via the modulated data signal in step 810. The detector 54 detects the signal in step 812 and the data is stored in a location corresponding to the memory address in step 814.

Programming the memory tag 42, 42' follows substantially the same steps as those described above for writing data to the memory device, except that the polling code is selected to direct the memory device 52, 204 to accept commands instead of data. The commands are then entered according to the programming protocol specified by the manufacturer.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other readers and memory devices, not necessarily the optical and RF readers generally described above.

For example, the memory tag 42 may have an optical detector and an RF emitter, or conversely, the memory tag 42 may have an RF detector and an optical emitter. Similarly, one skilled in the art will recognize that various circuit structures may be employed in the memory tag 42, 42' and tag reader 44, 44' depending upon the desired operational parameters. Also, by simply omitting the optical emitter 58, the photonic tag may be used as an optically writable memory.

Additionally, the invention may employ other machine readable symbols such as area or 2-D symbols, not just the exemplary linear bar code symbol described above. The machine readable symbol may encode data in addition to, or as a substitute for, the key discussed above. These and other changes can be made to the invention in light of the above-detailed description. In general, in the following claims, the terms used should not be construed to limit the invention to the specific embodiments disclosed in the specification and the claims, but should be construed to include all memory tag and machine readable symbol combinations that operate in accordance with the claims to provide a means or methods for communicating with the memory of the memory tag. Accordingly, the invention is not limited by the disclosure, but instead its scope is to be determined entirely by the following claims.

We claim:

1. A system for storing and retrieving data, the system comprising:

a memory device including a memory, a detector and an emitter coupled to the memory, and a symbol carried on the memory device, at least a portion of the symbol encoding a key for accessing the memory of the memory device; and a reader, the reader having a reading portion for reading the symbol, a transmitter for transmitting an interrogation signal to the detector of the memory device based on the key, and a receiver for receiving a data signal from the emitter of the memory device.

2. The system of claim 1 wherein the symbol is a bar code symbol.

3. The system of claim 1 wherein the symbol is printed on an exterior of the memory device.

4. The system of claim 1 wherein the memory device is formed as an RF tag, and wherein the detector of the memory device is an RF receiver and the emitter of the memory device is an RF transmitter.

5. The system of claim 1 wherein the transmitter of the reader is an RF transmitter and the receiver of the reader is an RF receiver.

6. The system of claim 1 wherein the memory device is formed as an optical tag, and wherein the detector of the memory device is an optical receiver and the emitter of the memory device is an optical transmitter.

7. The system of claim 1 wherein the reading portion of the reader is an optical scanner.

8. The system of claim 1 wherein the transmitter of the reader is an optical transmitter and the receiver of the reader is an optical receiver.

9. The system of claim 1 wherein the reader contains a table mapping a plurality of keys to a code for accessing at least a portion of the memory of the memory device, the key encoded in the symbol being selected from the plurality of keys.

10. The system of claim 1 wherein the reader further comprises:

a microprocessor; and a reader memory, wherein the reader memory, the reading portion and the transmitter of the reader are each coupled to the microprocessor.

11. An article for storing data, the article comprising:

a body;

a memory carried by the body;

a receiver carried by the body and coupled to the memory for activating the memory in response to an access code;

a transmitter carried by the body, the transmitter coupled to the memory for transmitting data stored in the memory; and a symbol associated with the body, at least a portion of the symbol encoding a key for accessing the memory.

12. The article of claim 11 wherein the symbol is carried by the body.

13. The article of claim 11 wherein the symbol is a bar code symbol.

14. The article of claim 11 wherein the symbol is printed on the body of the article.

15. The article of claim 11 wherein the receiver is an optical receiver and the transmitter is an optical transmitter.

16. The article of claim 11 wherein the receiver is an RF receiver and the transmitter is an RF transmitter.

17. The article of claim 11 wherein receiver is an optical receiver and the transmitter is an RF transmitter.

18. The article of claim 11 wherein the receiver is an RF receiver and the transmitter is an optical transmitter.

19. A method of storing data in a data storing device having a body, a logic, a memory, a detector and an emitter, the method comprising the steps of:

encoding data in a memory of the data storing device;

assigning a code in the logic of the data storage device, the code providing access to at least one portion of the data encoded in the memory of the data storage device; and encoding a key in a symbol on the body of the data storing device, the key being logically related to the code.

20. The article of claim 19 wherein the step of encoding a key in a symbol includes the step of encoding the key in a bar code symbol.

21. The method of claim 19, further comprising the step of providing a security data base, the security data base mapping a plurality of keys to a plurality of codes.

22. A method of retrieving data from a data storing device having a body, a logic, a detector and an emitter, a symbol carried on the body of the data storage device, the method comprising the steps of:

acquiring the symbol;

decoding the acquired symbol to acquire a key;

modulating an interrogation signal based on the key;

transmitting the modulated interrogation signal to access the memory of the data storing device; and receiving a data signal from the data storage device, the data signal encoding the data stored in the memory of the data storage device.

23. The method of claim 22, further comprising the step of acquiring a code from a security data base, based on the key, the code for inclusion in the interrogation signal.

24. The method of claim 22 wherein the step of acquiring the symbol includes the steps of:

illuminating the symbol with an optical beam; and acquiring the optical beam reflected from the symbol with an optical receiver.

25. The method of claim 22 wherein the step of modulating an interrogation signal includes the step of modulating an optical beam, and wherein the step of transmitting the modulated interrogation signal includes the step of transmitting the modulated optic beam.

26. The method of claim 22 wherein the step of modulating an interrogation signal includes the step of modulating an RF signal, and wherein the step of transmitting the modulated interrogation signal includes the step of transmitting the modulated RF signal.

27. A method of storing and retrieving data from an RF tag with an RF tag reader, the method comprising the steps of:

acquiring a key from a symbol carried on the RF tag;

modulating an RF transmission from the RF tag reader based on the acquired key;

receiving the modulated RF transmission from the RF tag reader at the RF tag;

retrieving data stored in a memory of the RF tag in response to the received modulated RF transmission from the RF tag reader;

modulating an RF transmission from the RF tag based on the retrieved data; and receiving the modulated RF transmission from the RF tag at the RF tag reader.

28. A method of storing and retrieving data from an optical tag with an optical tag reader, the method comprising the steps of:

acquiring a key from a symbol carried on the optical tag;

modulating an optical transmission from the optical tag reader based on the acquired key;

receiving the modulated optical transmission from the optical tag reader at the optical tag;

retrieving data stored in a memory of the optical tag in response to the received modulated optical transmission from the optical tag reader;

modulating an optical transmission form the optical tag based on the retrieved data; and receiving the modulated optical transmission from the optical tag at the optical tag reader.

29. A method of taking inventory of a plurality of items, the method comprising the steps of:

physically associating a respective one of a plurality of RF memory devices to each of the plurality of items; and physically associating at least one symbol with the plurality of items, the symbol encoding at least one key, the key being logically linked to a code for accessing at least one of the plurality of RF memory devices.

30. The method of claim 29 wherein the plurality of items are stored in a container, one symbol being carried on an exterior of the container, the symbol encoding a plurality of keys, each of the plurality of keys being logically linked with a respective one of the plurality of RF memory devices.

31. The method of claim 29 wherein the plurality of items are stored in a container, one symbol being carried on an exterior of the container for each of the plurality of items stored in the container, each symbol encoding a key, the key being logically linked with a respective one of the plurality of RF memory devices.

32. The method of claim 29, further comprising the steps of:

reading the at least one symbol associated with the plurality of items;

for each key encoded in the read symbol, transmitting the code logically linked to the key;

for each code transmitted, receiving a returned signal from the RF memory device accessed by the code; and for each received return signal, appropriately identifying the item in the inventory.

33. A method of securing information stored in a plurality of memory devices, each of the memory devices including a logic, a memory, and a detector and an emitter coupled to the logic and the memory, the method comprising the steps of:

encoding information into each of the plurality of memory devices;

assigning each of the plurality of devices a respective code selected from a plurality of codes;

associating a symbol with each of the plurality memory devices, the symbol encoding a key logically associated with the respective code assigned to the memory device; and providing a security database for converting the each of the keys to the respective code.

34. The method of claim 33, further comprising the steps of:

checking a security privilege against the database; and providing the code if the security privilege is adequate.

35. A reader for communicating with a memory device, the memory device carrying a machine readable symbol and an emitter for emitting a data signal, at least a portion of the machine readable symbol encoding data for accessing the memory device, the reader comprising:

a reading portion for reading the symbol;

a transmitter for transmitting an interrogation signal to the detector of the memory device based on the data for accessing the memory device; and a receiver for receiving, the data signal from the emitter of the memory device.

36. The reader of claim 35 wherein the transmitter of the reader is formed as an RF transmitter.

37. The reader of claim 35 wherein the receiver of the reader is formed as an RF receiver.

38. The reader of claim 35 wherein the reading portion of the reader is formed as optical receiver.

39. The reader of claim 38, further comprising:

a microprocessor; and a reader memory, wherein the reader memory and the optical receiver are each coupled to the microprocessor.

* * * * *